United States Patent [19]

Gans

[11] 3,717,814

[45] Feb. 20, 1973

[54] COPHASING DIVERSITY COMMUNICATION SYSTEM WITH PILOT FEEDBACK

[75] Inventor: Michael James Gans, New Shrewsbury Township, Monmouth County, N.J.

[73] Assignee: Bell Telephone Laboratories, Incorporated, Murray Hill, N.J.

[22] Filed: Sept. 23, 1971

[21] Appl. No.: 183,074

[52] U.S. Cl. ................325/56, 325/154, 343/100 CS

[51] Int. Cl. ..............................................H04b 7/02

[58] Field of Search ........325/56, 42, 47, 44, 59, 156, 325/157, 158, 154, 407, 4, 63, 369; 343/207, 208, 100 CS

[56] References Cited

UNITED STATES PATENTS 3,267,380 8/1966 Adams ..................................325/56

*Primary Examiner*—Robert L. Griffin
*Assistant Examiner*—Marc E. Bookbinder
*Attorney*—R. J. Guenther et al.

[57] ABSTRACT

Phase corrected intelligence signals are transmitted from a diversity array transmitter and receive in-phase at a mono-channel receiver. An individual pilot associated with each diversity branch and frequency separated from the pilots of the other branches is received along with the in-phase intelligence. All of the pilots are fed back, as part of the return modulation, to the diversity transmitter where they are used to establish the proper phase correction for the modulated intelligence transmission.

11 Claims, 1 Drawing Figure

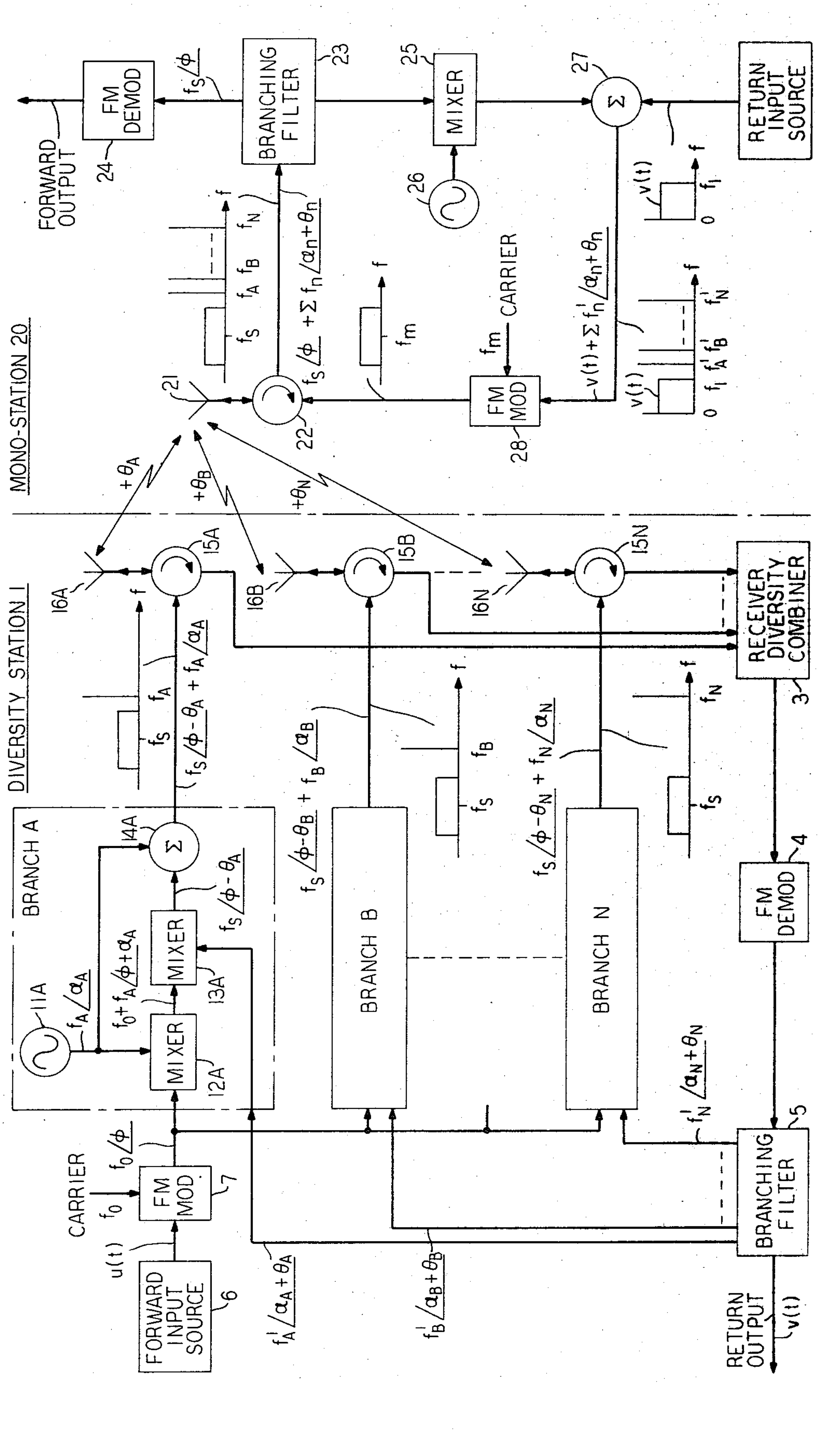
DIVERSITY STATION I
MONO-STATION 20
BRANCH A
BRANCH B
BRANCH N
FORWARD INPUT SOURCE
FM MOD
CARRIER
MIXER
RECEIVER DIVERSITY COMBINER
FM DEMOD
BRANCHING FILTER
RETURN OUTPUT
FORWARD OUTPUT
RETURN INPUT SOURCE

COPHASING DIVERSITY COMMUNICATION SYSTEM WITH PILOT FEEDBACK

BACKGROUND OF THE INVENTION

This invention relates to radio transmission systems having diversity capability and more particularly to systems, especially mobile radio systems, having two-way space diversity between a multiple antenna station and a single antenna station.

Radio signals are always subject to fading and if one station in the system is mobile, its movement has a serious adverse effect upon reception in an unpredictable manner. Space diversity systems have been found to overcome fading and provide improved reception over mobile radio links, and in such systems economic or physical constraints often compel the location of the diversity capability at a single diversity station, most commonly a fixed base station. The station at the other side of the link has only a single branch and is referred to hereinafter as a mono-station.

For reception at the diversity station there are many well known combining techniques which can be used. However, in order to provide appropriate diversity transmission to the mono-station, the diversity station requires feedback information from the mono-station. This feedback could be an analog signal used to control a variable phase shifter at the diversity station transmitter such as is disclosed in U.S. Pat. No. 3,267,380, issued Aug. 16, 1966 to R. T. Adams. It has also been suggested in a copending application of A. J. Rustako, Jr. and Y. S. Yeh, Ser. No. 102,422, filed Dec. 29, 1970, now U.S. Pat. No. 3,693,088 and assigned to the assignee hereof, that the feedback be a tone for control of antenna switching at the diversity transmitter. Both these systems require complex and expensive apparatus at the mono-station and are, due to the nature of the feedback information, directly applicable only to two-branch diversity systems. The objective of this invention is to provide cophased (maximal ratio or equal gain) reception at a mono-station by use of feedback which allows for any number of branches at a diversity station. Cophased reception can also be provided at the diversity station.

SUMMARY OF THE INVENTION

In accordance with the invention, transmission from the diversity station is provided by means of a multi-element array. The phase of each of the identical branch outputs is continuously preadjusted to provide in-phase intelligence reception at the mono-station. An individual pilot associated with each diversity branch and frequency separated from the pilots of other branches is transmitted from each antenna of the array and is received at the mono-station along with the in-phase intelligence. Each of the pilots is fed back as part of the return modulation to the diversity station transmitter where it is used to establish the proper phase correction for the modulated intelligence transmission from one of the branches.

By returning the received pilots as part of the modulation, their individual phase shifts produced enroute from the diversity station to the mono-station are preserved. At the diversity station the pilots are used to alter the output phases, while the incoming modulated carriers are cophased in a usual manner. This system thus provides two-way space diversity while using an inexpensive single branch station at one end of the link. It is therefore extremely well suited to high capacity mobile radio systems where a large number of low cost mobile stations are required.

BRIEF DESCRIPTION OF THE DRAWING

The drawing illustrates a diversity station and a mono-station operating with pilot feedback in accordance with the present invention.

DETAILED DESCRIPTION

In the system shown in the drawing, diversity station 1 is composed of $n$ identical branches, where $n = A \ldots N$. Branches B . . . N are identical to branch A except that oscillators 11 produce a different frequency in each branch. Similar signals and elements, such as antenna 16 and circulator 15, associated with each branch are designated by the same numerals and are delineated only by a letter such as $n$, representing an arbitrary branch, or a distinctive letter A through N, corresponding to one particular branch. Apparatus of station 1 common to all $n$ branches bears no alphabetic designation.

Station 1 transmits a forward modulated signal $f_s \underline{/\phi - \theta_n}$ and a pilot signal, $f_n \underline{/\alpha_n}$, from each branch A through N, where $f_s$ is the center frequency of the modulated signal band, $\phi$ is the information modulation common to each branch, $\theta_n$ is the phase shift that the signal is expected to experience when propagating from the $n^{th}$ branch antenna of diversity station 1 to mono-station antenna 21, and $f_n$ is the frequency of the pilot in the $n^{th}$ branch and $\alpha_n$ is its arbitrary phase. The most likely form of modulation would be FM and it will be assumed hereinafter that such modulation is used; however, any other appropriate modulation could be employed as well.

The forward signal originates with an input signal $u(t)$ generated by forward input source 6. This input signal frequency modulates a carrier in modulator 7 to produce a signal, $f_o \underline{/\theta}$, where $f_o$ is the carrier frequency and the modulation is designated $\phi$. The signal from source 6 is phase adjusted by $\theta_n$ in each branch so that the transmission from each antenna of diversity station 1 will arrive in-phase at mono-station 20. This pretransmission phase adjustment is accomplished by combining, in mixer 13 of each branch, the modulated input signal and the feedback pilot $f_n' \underline{/\alpha_n + \theta_n}$ to yield a difference product which contains the conjugate phase shift, $-\theta_n$, of the propagation shift contemplated for that branch.

The pilot generated in each branch by pilot oscillator 11 is an unmodulated tone at a slightly different frequency from the pilot on any other branch so that all pilots may be conveniently separated. The pilots are, however, close in frequency to the modulation band in order to conserve bandwidth and to remain within the phase coherence bandwidth of the signal so that the phase shift experienced by the pilot during propagation will be an accurate estimate of that experienced by the modulated portion of the signal. The arbitrary phase $\alpha_n$ of each pilot signal is cancelled prior to the preadjustment by first mixing the pilot with the output of FM modulator 7 in mixer 12 of each branch to yield a sum product having a phase $\phi + \alpha_n$. The output of phase adjusting mixer 13 thus contains only the forward modulation $\phi$ and the phase correction $\theta_n$ at the frequency designated $f_s$. The output of mixer 13 is combined with the pilot from oscillator 11 by summing circuit 14, and radiated by antenna 16 after passing through circulator 15. This produces a forward transmission in the $n^{th}$ branch of $f_s \ \angle \phi - \theta_n + f_n \ \angle \alpha_n$ which has a frequency spectrum in each branch as shown.

In addition to providing the phase preadjustment, mixer 13 also provides an output amplitude in proportion to the pilot amplitude giving maximal ratio weighting. Equal gain weighting can be obtained by limiting the feedback pilots prior to their application to mixer 13. It is noted that these feedback pilots are not used to phase correct the pilots transmitted from the diversity station as this would have a cancelling effect.

The combined pilots and modulated signals, $f_s \ \angle \phi + \Sigma f_n \ \angle \alpha_n + \theta_n$ are received at antenna 21 of station 20 and passed via circulator 22 to branching filter 23 where the received pilots $f_A \ \angle \alpha_A + \theta_A \ldots f_N \ \angle \alpha_N + \theta_N$ are separated from the modulation $f_s \ \angle \phi$. The signal-to-noise ratio of the modulated signal is improved by the diversity advantage of cophased reception due to the in-phase addition at antenna 21 of the phase corrected signals from the various branches of diversity station 1. This reception is conventionally detected in FM demodulator 24 to derive the forward output.

The pilots are translated in frequency from RF down to a band just above the upper frequency $f_1$ of the return input signal by translation oscillator 26 and mixer 25. The translated pilots $\Sigma f_n' \ \angle \alpha_n + \theta_n$ are then added to the return input $v(t)$ by combiner 27. The combination $v(t) + \Sigma f_n' \ \angle \alpha_n + \theta_n$, which is essentially a baseband signal, is used to modulate the mono-station carrier $f_m$ in modulator 28. The resultant transmission which consists of an ordinary FM wave passes via circulator 22 and is radiated by single antenna 21. Since the pilots are part of the modulation, they retain the phase information $\alpha_n + \theta_n$ which includes the arbitrary component $\alpha_n$ and the propagation shift component $\theta_n$ acquired enroute from antenna 16*n* at station 1 to mono-station antenna 21.

When the return transmission is received by diversity station 1 it is fed from each antenna 16 to diversity combiner 3 which cophases the reception from the antennas in a conventional manner. The cophased output is demodulated by FM demodulator 4 to produce the baseband signal $v(t) + \Sigma f_n' \ \angle \alpha_n + \theta_n$, the signal which was used to modulate mono-station carrier in modulator 28. The pilots are separated from the return output $v(t)$ in branching filter 5 and sent to their respective branches A through N to provide the preadjustment in mixers 13 of their respective outputs as described above.

The continuous pilots are narrowband filtered in the branching filters; they therefore have higher signal-to-noise ratio than the broadband FM signals. Thus, considerably less power may be used in transmitting the pilots than the intelligence signal and therefore a negligible power penalty is suffered due to the addition of the pilots and a negligible increase in FM deviation results from the pilots in the mono-station return transmission. Phase shifts common to all branches will not affect the cophasing produced by the phase adjustments and they have therefore been neglected. Relative phase shifts due to filters in the system are constant and may be corrected when installed. It is noted that selection diversity can also be employed if so desired simply by detecting the relative amplitudes of the received pilots as a measure of signal strength.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A communication system for transmitting between a first and a second station comprising:

A plurality of diversity branches at the first stations, means at the first station for generating an individual pilot signal in each of a plurality of diversity branches and for transmitting the individual pilot of each branch from an associated one of a plurality of spaced antennas, means at the second station for receiving the plurality of pilot signals, each having a distinctive phase component corresponding to the phase shift experienced during propagation from the first to the second station, means at the second station for deriving from each of the received pilots a feedback pilot and for modulating all of the feedback pilots onto a return transmission while preserving the distinctive phase component of each received pilot, means at the first station for transmitting on each of the plurality of spaced antennas a common forward intelligence signal, and means at the first station for receiving the return transmission and utilizing the distinctive phase component of each feedback pilot to adjust the phase of the forward intelligence signal being transmitted by the corresponding branch antenna.

2. A communication system as claimed in claim 1 wherein said means for adjusting the phase of the forward intelligence signal includes means in each branch for subtracting from the phase of the forward transmission the phase shift experienced by the pilot transmitted by that antenna.

3. A communication system as claimed in claim 1 wherein said means for adjusting the phase of the forward intelligence signal includes means in each branch for mixing the forward intelligence signal and the feedback pilot associated with that branch.

4. A communication system as claimed in claim 1 wherein said means for generating an individual pilot includes in each branch an oscillator for producing a tone separated in frequency from all other individual pilots, and wherein said means for adjusting the phase of the forward intelligence signal includes in each branch a first mixer for mixing the oscillator tone with the forward intelligence signal and a second mixer for mixing the output of the first mixer with the feedback pilot signal associated with that branch.

5. A communication system as claimed in claim 4 wherein said means for adjusting the phase of the forward intelligence signal includes means for frequency separating the feedback pilots and for applying each of the separated pilots to its associated branch.

6. A communication system as claimed in claim 4 wherein each branch further includes a combiner for adding the pilot tone and the output from the second mixer, whereby each antenna transmits a phase adjusted intelligence signal and an unadjusted pilot signal.

7. A communication system as claimed in claim 1 wherein said means at the second station for deriving the feedback pilots includes means for reducing the frequency of the received pilots, and wherein said means for modulating the feedback pilots onto a return transmission includes means for combining a return intelligence signal with the received pilots reduced in frequency.

8. A communication system as claimed in claim 7 wherein said first station includes means for receiving the return transmission on a plurality of antennas and means for cophasing the return intelligence signals received on the plurality of antennas.

9. A communication system as claimed in claim 1 wherein said second station is a single branch station having a single antenna which receives in-phase the plurality of phase adjusted forward intelligence signals transmitted from each branch of the first station, and includes means for separating the received pilots from the in-phase reception.

10. A diversity transmission system comprising:

a diversity station including a plurality of branches, a source for generating forward intelligence, means for transmitting via each branch an independent pilot signal and a forward information signal on which the forward intelligence is modulated, means for receiving a modulated return transmission and applying therefrom to each branch a feedback pilot signal, and means in each branch for adjusting the phase of the forward information signal in accordance with the feedback pilot signal associated with that branch, and a mono-station including a single branch for receiving the plurality of transmitted pilot signals and forward information signals, a source for generating the return intelligence, means for separating the plurality of received pilot signals from the received forward information signals, and means for modulating both the return intelligence and the separated pilots onto the return transmission.

11. A communication system of the type having a multibranch diversity station, a single branch mono-station, means for transmitting intelligence and pilot information from each of the branches at the diversity station, means for receiving the transmission at the mono-station, feedback means for transmitting from the mono-station to the diversity station an indication of the fading due to the propagation between the diversity station and the mono-station and means utilizing this indication for adjusting the diversity transmission, characterized in that the means for transmitting from the diversity station includes means for transmitting a distinct frequency separated pilot from each branch, the feedback means includes means for separating the pilots from the remainder of the reception at the mono-station, and means for modulating the return transmission from the mono-station by each of the separated pilots to preserve as an indication of the fading each received pilot's amplitude and phase, and the means for adjusting the diversity transmission includes means in each branch for mixing the intelligence portion of the diversity transmission and the feedback pilot signal associated with that branch, so that the intelligence portions of the transmissions from all branches are received in-phase at the mono-station.

* * * * *

UNITED STATES PATENT OFFICE

CERTIFICATE OF CORRECTION

Patent No. 3,717,814 Dated February 20, 1973

Inventor(s) Michael J. Gans

It is certified that error appears in the above-identified patent and that said Letters Patent are hereby corrected as shown below:

In column 3, line 20, "$f_A \angle \alpha_A + \theta_A \ldots f_N \angle \alpha_N + \theta_N$" should read --$f_A \angle \alpha_A + \theta_A \ldots f_N \angle \alpha_N + \theta_N$--.

In column 4, line 16 (claim 1) "A" should read --a--.

In column 4, line 16 (claim 1) "stations" should read --station--.

In column 4, line 18 (claim 1) "pilot signal" should read --unmodulated pilot tone--.

In column 4, line 18 (claim 1) "a plurality of" should read --the--.

In column 4, line 23 (claim 1) "pilot signals" should read --pilots--.

In column 4, line 62 (claim 4) "signal" should be omitted.

In column 5, line 3 (claim 6) "pilot" should read --oscillator--.

In column 5, line 5 (claim 6) "signal" should be omitted.

Signed and sealed this 3rd day of July 1973.

(SEAL)
Attest:

EDWARD M.FLETCHER,JR.
Attesting Officer

Rene Tegtmeyer
Acting Commissioner of Patents

)RM PO-1050 (10-69)

USCOMM-DC 60376-P69
☆ U.S. GOVERNMENT PRINTING OFFICE : 1969 O—366-334